Oct. 9, 1956  R. E. CHURCH  2,765,860
SELECTIVE WHEELED OR ENDLESS BELT SUPPORTS
FOR SELF-PROPELLED VEHICLES
Filed Oct. 12, 1953  4 Sheets-Sheet 1

INVENTOR:
ROBERT E. CHURCH

BY Eaton & Bell
ATTORNEYS

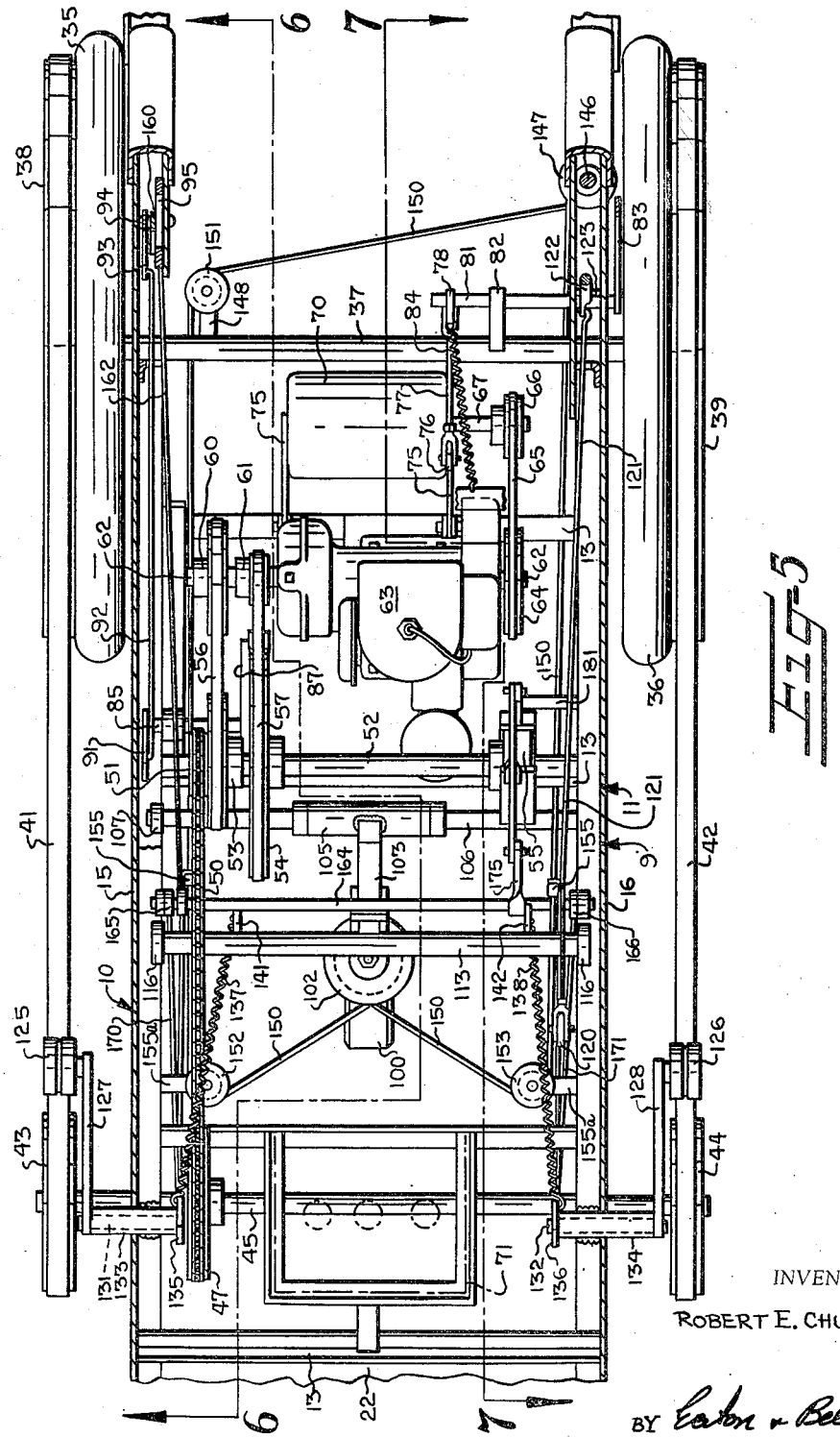

Oct. 9, 1956

R. E. CHURCH 2,765,860

SELECTIVE WHEELED OR ENDLESS BELT SUPPORTS
FOR SELF-PROPELLED VEHICLES

Filed Oct. 12, 1953

INVENTOR:
ROBERT E. CHURCH
BY
Eaton & Bell
ATTORNEYS

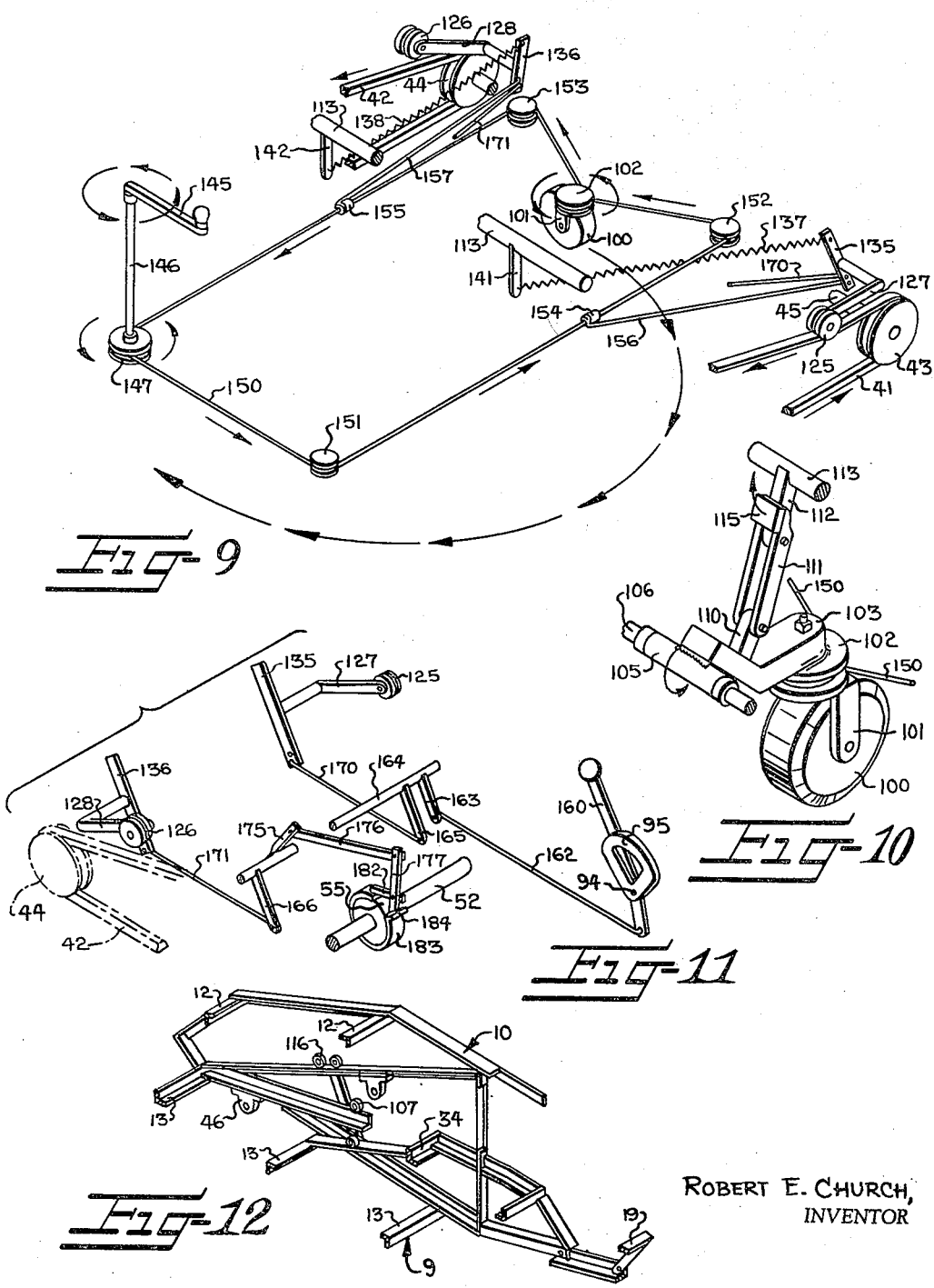

United States Patent Office 2,765,860
Patented Oct. 9, 1956

2,765,860

SELECTIVE WHEELED OR ENDLESS BELT SUPPORTS FOR SELF-PROPELLED VEHICLES

Robert E. Church, Elkin, N. C.

Application October 12, 1953, Serial No. 385,527

6 Claims. (Cl. 180—6.4)

This invention relates to an improved vehicle drive system for self-propelled vehicles, such as wheel chairs and the like and more especially to an improved drive system for wheel chairs which may be controlled solely by the hands of the operator and is, therefore, particularly adapted for use by persons afflicted with paraplegia.

The primary object of this invention is to provide a self-propelled vehicle, such as a wheel chair or the like, which is capable of riding or climbing objects such as curbstones, stairs and the like wherein primary traction means are provided together with auxiliary retractable traction means in the form of endless traction belts, and said latter means being manually movable into and out of operable position.

It is another object of this invention to provide a self-propelled vehicle which will enable paraplegics to travel comfortably and unassisted over street curbings, stairs and the like by means of endless tracks or belts provided on opposite sides of the vehicle, whose rear portions are mounted on rims projecting axially from front ground wheels. A retractable caster wheel is provided adjacent the rear of the vehicle and centrally alined therewith which is responsive to manual control elements for selectively positioning the caster wheel on a lower or higher level than the runs of the endless belts or tracks so that the vehicle may be supported by either the caster wheel or the endless belts as desired.

It is another object of this invention to provide a vehicle of the type described wherein manually operable steering means are also provided for turning the caster wheel in either direction about a vertical axis and which are so constructed as to also increase the tension in one of the endless tracks or belts while correspondingly decreasing the tension in the other of the endless tracks or belts whereby the vehicle has a very short radius of turn regardless of whether the rear portion of the vehicle is supported by the caster wheel or the endless belts or tracks.

It is another object of the invention to provide a self-propelled vehicle of the character last described wherein a control element in addition to the steering element is provided which, upon movement in one direction, will release the tension in both of the endless tracks or belts so the operator may propel the vehicle by manually moving the front wheels thereof and wherein movement of the control element in the opposite direction will brake the vehicle.

It is still another object of this invention to provide a self-propelled vehicle of the character described which has an internal combustion engine and an electric starter for the internal combustion engine with an endless belt for transmitting power from the starter to the engine, a pair of power transmission belts driven by the engine and connected to a jack shaft by means of variable size pulleys, and which jack shaft has connections extending therefrom to the rear wheels of the vehicle on which said endless tracks are mounted.

It is another object of this invention to provide a plurality of control levers adjacent the seat of the vehicle for easy manipulation by the operator, a first of said manually movable levers being operable to control the tension in the starter belt during the starting of the internal combustion engine, a second of the control levers having means connected thereto for applying tension to said pair of transmission belts, said second control lever being movable in one direction to apply tension to one of said belts for driving the vehicle at a given speed and being movable in the other direction to tension the other of the transmission belts for driving the vehicle at another speed. A third of the manually movable control levers is operable to turn the caster wheel in either direction and also serves to simultaneously increase the pressure on either of the endless tracks while correspondingly decreasing the traction on the other of the endless tracks. A fourth of the levers controls the raising and lowering of the caster wheel relative to the frame of the vehicle, and a fifth of the levers is manually movable in one direction to move the endless track tensioning means out of engagement with the endless tracks regardless of the position of the steering element or third manually movable control lever, said fifth control lever being movable in the other direction to actuate a braking mechanism for stopping the vehicle.

Some of the objects of the invention having been stated, other objects will appear as the description proceeds when taken in connection with the accompanying drawings, in which—

Figure 3 is a view of the vehicle looking at the opposite side from that shown in Figure 2, showing the retractable wheel in inoperative or retracted position and showing the vehicle as though traveling over a projection such as a curb of a sidewalk or the like;

Figure 5 is an enlarged top plan view of the improved vehicle taken substantially along the line 5—5 in Figure 3 but omitting the driver's seat for purposes of clarity and showing the sidewalls of the vehicle in cross-section;

Figure 9 is a schematic view showing the connections leading from the steering control lever to the caster wheel and the endless track tensioning devices for controlling the turning of the vehicle;

Figure 10 is an enlarged isometric detail showing the manner in which the retractable caster wheel is mounted and showing the caster wheel in lowered or operative position;

Figure 11 is a schematic isometric view of the braking system showing how the brake control lever moves a brake band around a brake drum and also controls movement of the tension devices relative to the endless tracks;

Figure 12 is an isometric view showing the framework at the left-hand side of the vehicle, the framework at both sides of the vehicle being substantially the same, except opposite-hand.

Figure 3:
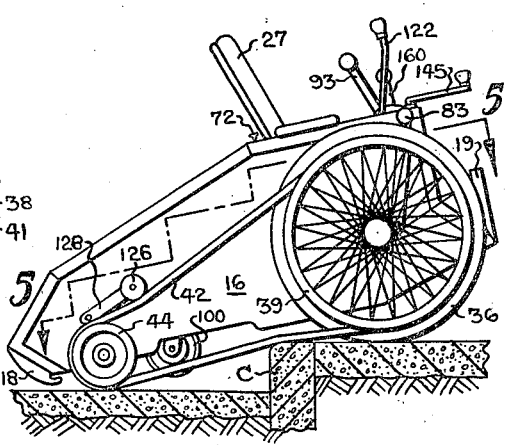

Referring more specifically to the drawings, the numeral 9 broadly designates the frame of the vehicle and the numerals 10 and 11 broadly designate left-hand and right-hand built-up side frame members which are spanned by a plurality of upper and lower transverse frame members 12 and 13, respectively. The frame 9 of the vehicle is substantially rectangular in plan and in cross-section. Sidewalls or panels 15, 16 are suitably secured to the outer surfaces of the respective side frame members 10, 11 and the upper and rear portions of the side frame members 10, 11 are spanned by upper or top wall panels 20, 21 which are inclined downwardly and rearwardly, the lower edge of the panel 21 being connected to the upper rear edge of a relatively narrow forwardly and downwardly inclined bottom panel 22. A suitable bumper 18 is fixedly secured to the bottom panel 22 which bumper 18 serves to prevent injury to the vehicle when traversing rough ground such as shown in Figure 3.

Figure 1:
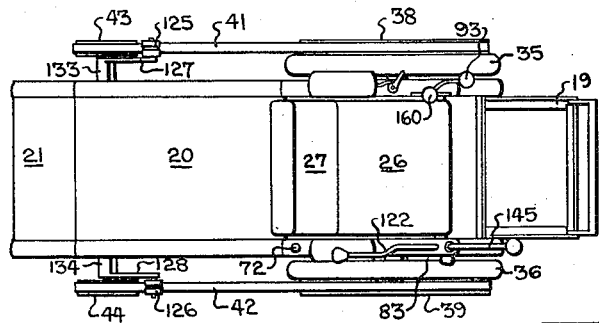
Figure 1 is a top plan view of the improved self-propelled vehicle.
Figure 2:
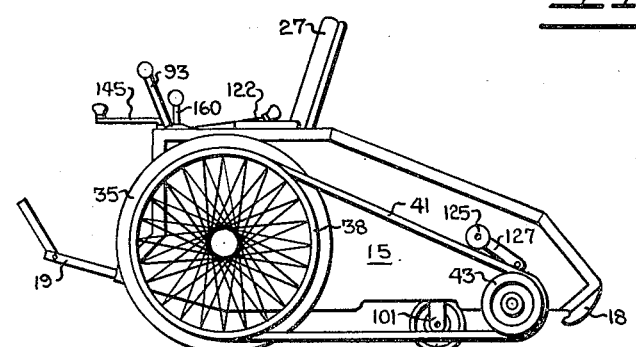
Figure 2 is an elevation of the vehicle showing the retractable wheel in lowered operative position.
Figure 4:
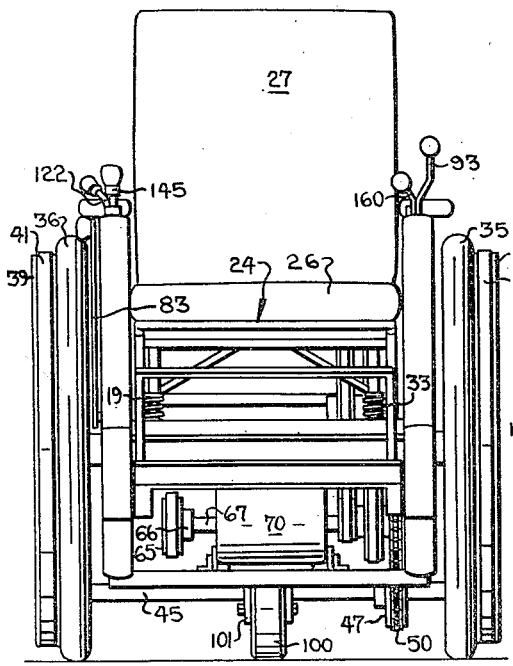
Figure 4 is an enlarged front elevation of the vehicle.

The front edge of the top panel 20 terminates substantially rearwardly of the front end of the side frame members 10, 11 to form an opening upwardly through which a backrest portion 23 of a seat frame 24 extends, the seat frame 24 having a horizontally disposed portion 25 and also having seat and backrest cushions 26 and 27 suitably secured to the respective portions 25, 23 thereof. The substantially horizontal portion 25 of the seat frame 24 has front and rear legs 30, 31 projecting downwardly therefrom, the front legs 30 being pivoted, as at 32, on the frame 9 and the lower ends of the rear legs 31 having the upper ends of compression springs 33 connected thereto whose lower ends bear against a part of the frame of the machine, such as a transverse frame member 34. A pivoted foot rest 19 is pivotally connected to the lower front portion of the side frame members 10, 11, which foot rest may be extended as shown in Figures 1 and 2, or doubled upon itself as shown in Figure 3.

The vehicle, which is shown as a wheel chair, has a pair of relatively large front traction wheels 35, 36 rotatably mounted on opposite ends of a front transverse shaft 37 suitably secured adjacent opposite ends thereof to the respective side frame members 10 and 11. The front wheels 35, 36 have respective outwardly projecting annular flanges, pulleys or circular portions 38, 39 thereon which are preferably of slightly less diameter than the diameter of the front wheels 35, 36 and are also preferably peripherally grooved to accommodate resilient endless tracks or crawler belts 41, 42 whose rear portions engage respective relatively small pulleys or rear wheels 43, 44, which are also preferably peripherally grooved to maintain the crawler or traction belts 41, 42 in engagement therewith during turning movement of the vehicle.

The rear wheels 43, 44 are fixed on opposite ends of a rear axle or shaft 45 rotatably mounted in bearing blocks 46 suitably secured to the lower rear portions of the side frame members 10 and 11. A sprocket wheel 47 is fixed on the medial portion of the rear axle or shaft 45 adjacent the side frame member 10 and is engaged by a sprocket chain 50 which also engages a sprocket wheel 51 fixed on a jack shaft 52 suitably journaled at opposite ends thereof on the side frame members 10, 11. The jack shaft 52 also has a pair of pulleys 53, 54 and a brake drum 55 fixed thereon (Figures 5, 6 and 7), the pulley 54 being of a substantially greater diameter than the pulley 53. The pulleys 53, 54 are preferably grooved pulleys and are engaged by respective endless belts 56, 57 which may be termed power transmission belts and which also engage respective pulleys 60, 61 fixed on an outwardly extending portion of a crank shaft 62 of a prime mover such as a gasoline engine 63, it being noted that the pulley 60 is of substantially greater diameter than the pulley 61.

The gasoline engine 63 is suitably supported on the centermost pair of adjacent transverse frame members 13 and the end of the shaft 62 has a pulley 64 fixed thereon adjacent the end remote from the pulleys 60 and 61, said pulley 64 being engaged by a normally slackened endless starter belt 65 which also engages a relatively small pulley 66 fixed on a shaft 67 of an electric starter motor 70. Suitable electrical connections, not shown, extend between the starter motor 70 and a storage battery 71 carried by the frame 9 adjacent the rear end of the vehicle and a suitable manually operable switch 72 is interposed in said electrical connections and supported by the frame member 11 adjacent the seat frame 24.

Figures 6, 7:
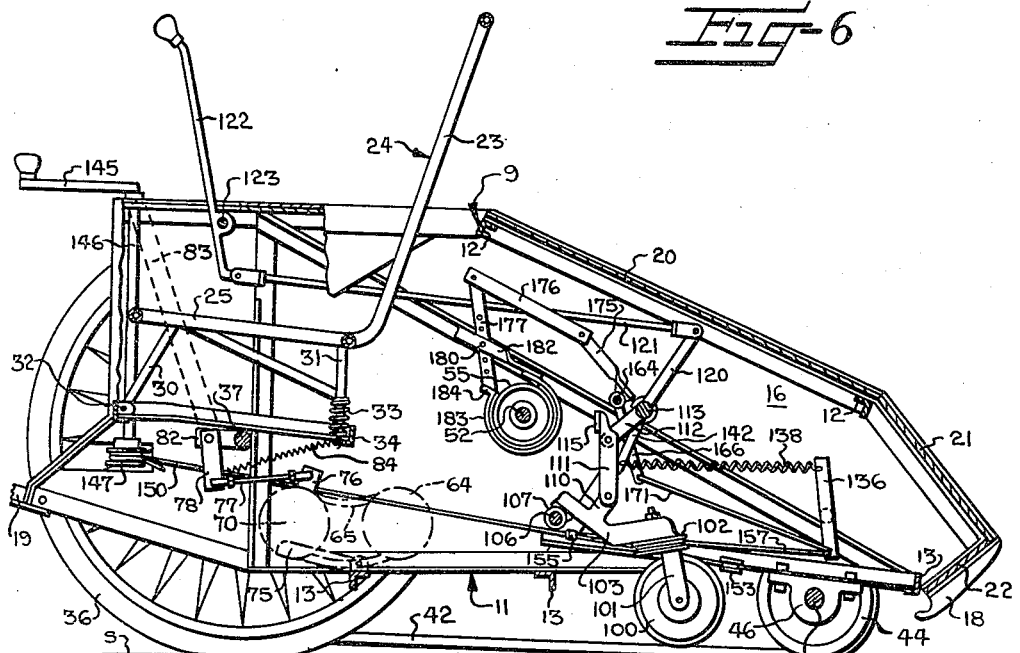
Figure 6 is a longitudinal vertical sectional view through the vehicle taken substantially along the line 6—6 in Figure 5, showing the seat frame but omitting the seat cushions for purposes of clarity.
Figure 7 is a view similar to Figure 6 but being taken substantially along line 7—7 in Figure 5.

It will be observed in Figures 5 and 7 that the housing of the starter motor 70 is pivotally supported on the front end of a pair of arms 75 which extend rearwardly and are fixed to the adjacent transverse frame member 13 of the frame 9. One end of the starter motor 70 has arm 76 fixed thereto and projecting upwardly therefrom to which the rear end of a link 77 is pivotally connected. The front end of link 77 is pivotally connected to the lower end of a crank arm 78 which extends upwardly and is fixed on a relatively short transverse shaft 81. The transverse shaft 81 is journaled in a block 82 projecting from the transverse shaft 37 and is also journaled in the side panel 16 and its outer end has the lower end of a starter control lever 83 fixed thereon (Figures 2, 3, 4, 5 and 7).

It will be observed in Figure 3 that the upper end of the starter operating lever or handle 83 terminates adjacent the upper front corner of side panel 16 or side frame member 11, to which position it is normally urged by a tension spring 84 in Figures 5 and 7. Thus, when the switch 72 is closed, the starter belt 65 is slack permitting free rotation of the shaft 67 and the pulley 66, whereupon the operator then moves the starter lever or handle 83 rearwardly or in a clockwise position in Figure 7 to cause the motor 70 to pivot forwardly to thereby take up the slack in the starter belt 65 to impart rotation to the crankshaft 62 of the engine 63 for starting the same. Of course, the usual throttle and other controls for the engine may be provided adjacent the switch 72 and, since such controls for the engine are well known in the art, a description thereof is deemed unnecessary.

After the engine 63 has started, the starter lever or handle 83 is permitted to return to its original position by means of tension spring 84 so the crankshaft 62 and pulleys 60, 61 and 64 may rotate independently of the then slackened starter belt 65.

Figure 8:
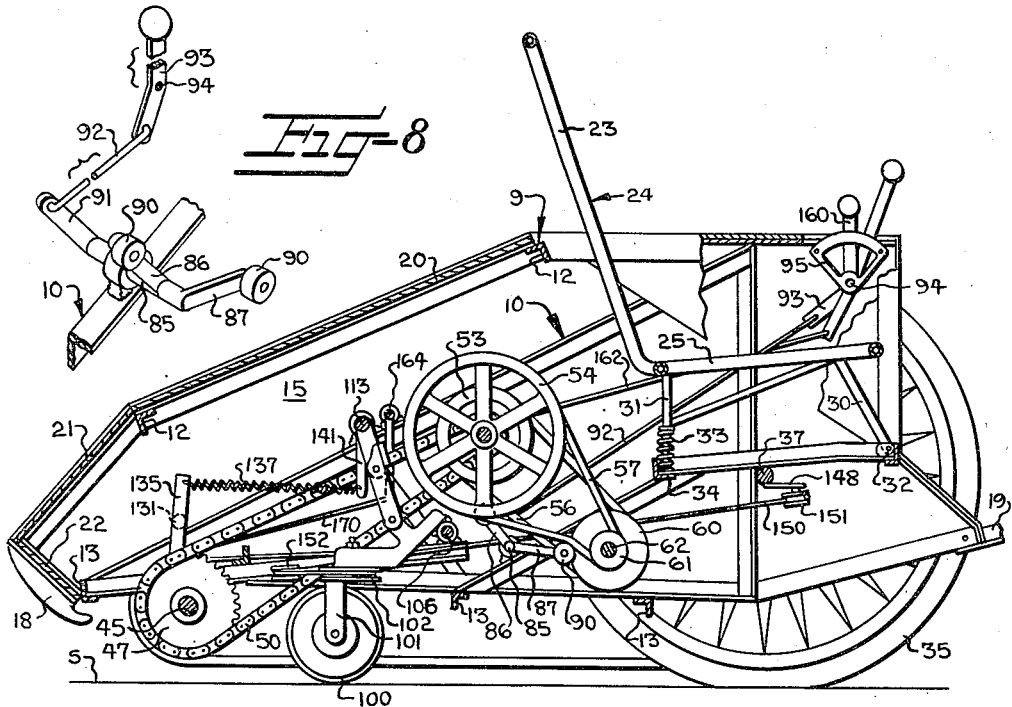
Figure 8 is an enlarged isometric detail of the transmission belts tensioning arms and control means, with parts broken away.

The transmission belts 56, 57 are also normally slack so the pulleys 60, 61 rotate independently of the belts 56, 57 when the engine 63 is initially started. In order to selectively apply tension to the transmission belts 56, 57, the frame member 10 has a relatively short shaft 85 journaled therein which has a pair of longitudinally and vertically spaced transmission belt tensioning arms or devices 86, 87 (Figure 8) fixed thereon whose free ends have suitable rollers 90 thereon adapted to alternately engage respective transmission belts 56, 57. The outer end of shaft 85 has a crank arm 91 fixed thereon, to the free end of which the lower end of a rigid link 92 is pivotally connected (Figures 5, 6 and 8), which link extends upwardly and forwardly at an angle and is pivotally connected to the lower end of a transmission control lever 93 pivotally mounted intermediate its ends on a pivot shaft 94 carried by a quadrant 95 suitably secured to the upper front portion of the side frame member 10. The upper portion of the lever 93 extends above the side panel 15 and the side frame member 10 and is adapted to be moved forwardly and rearwardly by the operator.

Thus, when the lever 93 is in a neutral or intermediate position, neither of the belts 56 or 57 is placed under tension, but upon forward movement of the transmission lever 93, the roller 90 on arm 87 moves into engagement with and takes up the slack in the transmission belt 57 to drive the jack shaft 52 at a relatively slow speed and, to in turn, drive the pulleys 43, 44 and the front wheels 35, 36 at a relatively slow speed. On the other hand, upon rearward movement of the power transmission lever 93, that is, upon movement thereof in a counterclockwise direction in Figure 6, the roller 90 on arm 87 moves out of engagement with belt 57 as the roller 90 on arm 86 moves into engagement with, and takes up the slack in, the high speed transmission belt 56 to thereby impart rotation to the pulleys 43, 44 and the front wheels 35, 36 at a relatively high rate of speed.

Disposed slightly forwardly of the rear axle 45 and substantially midway between the endless crawler belts 41, 42 is a steerable and retractable rear caster or idler wheel 100 which is rotatably mounted in a fork 101 having a substantially horizontally disposed grooved pulley 102 formed integral therewith or suitably secured thereto. The caster wheel 100 is rotatably mounted for movement about a substantially vertical axis on a pivoted caster supporting bracket 103, which extends forwardly and upwardly at an angle from the pulley 102 and its front upper end is suitably secured, as by welding, to a tubular member 105 oscillatably mounted on a transverse shaft 106 fixed in blocks 107 carried by the side frame members 10, 11.

It will be observed in Figures 5, 6, 7, and 10 that the medial portion of the bracket 103 has an upwardly projecting portion 110 thereon to which the bifurcated lower end of a toggle lever 111 is pivotally connected, the upper portion of the toggle lever 111 being pivotally connected to the free end of a crank arm 112 projecting downwardly from a transverse rocker shaft 113. The upper end of the toggle lever 111 has a transverse portion 115 thereon which is adapted to engage the crank arm 112 when the caster wheel 100 is in lowered or operative position as shown in Figures 6 and 10. The rocker shaft 113 is journaled in suitable bearings 116 (Figures 5, 6, 7 and 12) carried by the side frame members 10, 11.

The rocker shaft 113 has a crank arm 120 (Figure 7) fixed thereto adjacent the side frame member 11 and to the free end of which a link or connecting arm 121 is pivotally connected. The connecting rod 121 extends forwardly and is pivotally connected to the lower end of a wheel raising and lowering manual control lever 122 which is pivoted intermediate its ends, as at 123, on the side frame member 11 adjacent the upper front corner thereof. When it is desired to lower the caster wheel 100 into operative position, that is, into contact with a surface S upon which the vehicle is positioned to raise the rear portion of the vehicle and the endless tracks 41, 42 from the surface S, the upper portion of the wheel raising and lowering lever 122 is moved rearwardly in Figure 7 to rotate rocker shaft 113 in a counter-clockwise direction to cause the junction points of the toggle lever 111 and the crank arm 112 to move rearwardly beyond dead center and to thereby cause the wheel 100 to move downwardly until it engages the surface S upon which the vehicle is positioned thus causing the rear portion of the vehicle to move upwardly a predetermined distance, in the course of which the endless tracks or crawler belts 41, 42 are moved out of engagement with the surface S. Thus, the vehicle is readily converted from a crawler type of drive to a tricycle type of drive and vice versa, merely by manipulating the wheel raising and lowering lever 122. The transverse portion 115 on the toggle arm 111 serves as limiting means by engaging and locking the crank arm 112 upon the caster wheel 100 being lowered a sufficient distance to raise the rear end of the vehicle in the manner described.

It is apparent that the rear portions of the lower runs of the endless tracks 41, 42 are permitted to move, by gravity, into engagement with the surface S by moving the wheel raising and lowering lever 122 forwardly from the position shown in Figure 2 to the position shown in Figures 3 and 7 to retract the caster wheel from the position shown in Figure 6 to substantially the position shown in Figure 7.

As in the case of the belts 56, 57 and 65, the endless tracks or crawler belts 41, 42 fit loosely upon their pulleys so that the pulleys may turn freely relative thereto in the absence of any belt tightening pressure. In order to control the tension in the belts 41, 42 independently of each other, a crawler belt tensioning pulley or idler is mounted above the top run of each of the crawler belts 41, 42, immediately forwardly of the rear wheels or pulleys 43, 44, these idlers being indicated at 125, 126. The idlers 125, 126 are mounted for substantially vertical swinging movement relative to the adjacent belts 41, 42 on the outer ends of respective idler arms 127, 128 which extend rearwardly and are fixed on the outer ends of respective pivot shafts 131, 132 journaled in respective tubular bearing blocks 133, 134 carried by respective frame members 10, 11 and extending through the respective wall members or panels 15, 16.

The proximal or inner ends of the pivot shafts 131, 132 have the medial portions of respective bars or levers 135, 136 fixed thereon to the upper ends of which respective tension springs 137, 138 are connected (Figures 5, 6, 7 and 9). The tension springs 137, 138 converge forwardly from the levers or bars 135, 136 and are connected to the lower free ends of respective arms 141, 142 whose upper ends are suitably secured to the transverse rocker shaft 113, as is most clearly shown in Figure 9. Thus, the tension springs 137, 138 normally tend to urge the idlers 125, 126 into engagement with the upper surfaces of the upper runs of respective crawler belts 41, 42 for maintaining the same under tension.

Regardless of whether the caster wheel 100 is in retracted or lowered position, there is always sufficient tension in the springs 137, 138 to maintain the idlers 125, 126 in engagement with the respective crawler belts 41, 42. However, in the event the caster wheel 100 is retracted, as shown in Figure 7, and the vehicle is moving upwardly along a relatively steep inclined surface or is moving upwardly over a curb such as the curb indicated at C in Figure 3, or if the crawler belts 41, 42 happen to have become wet so that they would normally slip on their respective pulleys 37, 43 and 38, 44, it is merely necessary for the operator to exert forward pressure on the wheel raising and lowering lever 122 to rotate the rocker shaft 113 in a counter-clockwise direction in Figure 6 to thereby effect additional tension in the springs 137, 138 and to thereby increase the pressure at which the idlers 125, 126 engage respective crawler belts 141, 142.

It will be observed in Figures 1 through 4, 7 and 9 that the right-hand front end of the vehicle has a manually movable steering element in the form of a substantially horizontally disposed guide arm or lever 145 fixed on the upper end of a steering post 146 immediately above the uppermost front corner of the side frame member 11 adjacent the seat frame 24. The steering post 146 is rotatably mounted in the front portion of the side frame member 11 and has a pulley 147 fixed on its lower end which is engaged by a steering cable 150. The cable 150 is preferably wound about the pulley 147 at least one revolution, and is also preferably fixed to the pulley 147. The cable 150 extends across the vehicle from the pulley 147 and beneath the seat frame 24 and passes partially around an idler pulley 151 mounted on a strap member 148 extending forwardly from the front transverse shaft or axle 37. The cable 150 extends rearwardly from the two pulleys 147, 151 and passes partially around a pair of idler pulleys 152, 153 and then converges inwardly and passes around the grooved pulley 102, to which the cable 150 is preferably suitably secured. The pulleys 152, 153 are rotatably mounted on rigid strap members 155ᵃ suitably secured to, and extending inwardly from the respective side frame members 10, 11. It is thus seen that movement of the guide arm or steering element 145 in either direction will cause the caster wheel 100 to rotate about a vertical axis in the corresponding direction.

It will be observed in Figure 9 that opposite side runs of the cable 150 have respective stop members or abutments 154, 155 fixed thereon which are adapted to engage the front ends of respective auxiliary steering cables 156, 157, which front ends are loosely mounted on the corresponding runs of the cable 150. The cables 156, 157 extend rearwardly and are connected to the lower ends of respective levers 135, 136 fixed on the proximal ends of the pivot shafts 131, 132. The length of the cables 156, 157 and the position of the stops or abutments 154, 155 on the two side runs of the cable 150 are such that the idler arms 127, 128 will occupy identical positions relative to the crawler belts 41, 42, whereby each belt will be equally tensioned and an equal amount of power conveyed to each ground wheel 35, 36 when the vehicle is proceeding in a straight course.

It is thus evident that rotation of the guide bar or steering element 145 in either direction imparts corresponding rotation to the caster wheel 100 about its vertical axis and correspondingly increases the tension in one of the crawler belts while decreasing or entirely releasing the tension in the other of the crawler belts. For example, when the guide bar or steering element 145 is rotated in a counter-clockwise direction from a forward position to an inward position substantially as shown in Figure 9, it is apparent that the side run of the main steering cable 150 extending between pulleys 147, 153 moves forwardly as the opposite side run moves rearwardly and, at the same time, the caster 100 moves in a counter-clockwise direction so the stops 154, 155 and the caster 100 occupy substantially the position shown in Figure 9.

Since the stop 154 moves rearwardly as the stop 155 moves forwardly, the tension in the tension spring 137 tends to increase the downward pressure on the idler 125 thereby increasing the tension on the endless track or crawler belt 41. Conversely, the stop 155 causes the cable 157 to move forwardly and thereby moves the idler 126 away from the crawler belt or endless track 42, thereby correspondingly decreasing the tension in the crawler belt 42 and permitting the pulley 44 to rotate freely without engaging the endless track 42. It is to be noted that this condition occurs regardless of how much forward pressure is exerted on the wheel raising and lowering lever 122 by the operator.

Accordingly, in full right-hand turn position, no power is transmitted to the right-hand crawler belt 42 or the right-hand front wheel 36 and it is permitted to remain relatively stationary while the left-hand front wheel 35 and the left-hand crawler belt 41 are driven so that an extremely short turn is effected of a radius equal substantially to the tread of the front wheels 35, 36 regardless of whether the turning of the vehicle is effected by the caster wheel 100 in lowered or operative position or the endless tracks or crawler belts 41 and 42 when the caster wheel 100 is in retracted position. As a turn of greater radius is caused by the operator moving the guide bar or steering element forwardly from the position shown in Figure 9, the tension in the belt 41 will be gradually lessened as the tension in the belt 42 is gradually increased. In this manner the drive system functions upon a slight turn of the steering post 146 in either direction to diminish the power transmission to the ground wheel or crawler belt inside the turn, and correspondingly increase the power transmission to the ground wheel or crawler belt outside the turn.

To release the connections to both front wheels 35, 36, so they may be manually rotated freely regardless of whether the engine 63 is running and so that the operator need not impart rotation to the intervening connections between the engine 63 and the crawler belts or endless tracks 41 and 42, a combination idler and brake control lever 160 is provided adjacent the seat 24 within easy reach of the operator, the medial portion of which is also oscillatably mounted intermediate its ends on the pivot shaft 94 carried by the quadrant 95. The lower end of the lever 160, below the pivot shaft 94, has the front end of a rigid link 162 pivotally connected thereto, as best shown in Figures 6 and 11, whose rear end is pivotally connected to a crank arm 163 fixed on a second transverse rocker shaft 164. The rocker shaft 164 also has an additional pair of crank arms 165, 166 fixed thereon and extending downwardly therefrom to which the front ends of respective flexible or pliable cables 170, 171 are connected. The rear ends of the cables 170, 171 are connected to the lower ends of the respective levers 135, 136.

The lever 160 normally occupies the neutral position shown in Figure 6, which permits normal operation of the steering mechanism in varying the tension effected in the crawler belts or endless tracks 41, 42 by the respective idlers 125, 126 in the manner heretofore described. When the combination brake and idler lever 160 is moved rearwardly or in a counter-clockwise direction from the position shown in Figure 6 to that in Figure 11, the springs 137, 138 are biased or stretched thereby as both of the idlers 125, 126 are moved upwardly out of contact with the respective crawler belts or tracks 41, 42. Thus, the operator may rotate either or both of the front ground wheels 35, 36 by hand, if desired, without rotating the rear axle 45 and the parts connected thereto.

It will be observed that when the brake or idler control lever 160 is in the neutral position shown in Figure 6, the lower end of either of the levers 135 or 136 may be moved inwardly by corresponding roller 125 or 126 out of contact with the adjacent belt 41 or 42, since the corresponding cable 170 or 171 will then merely be slackened thereby without changing the position of the rocker shaft 164 and the combination idler and brake control lever 160.

In order to stop or retard movement of the vehicle, it is merely necessary to exert forward pressure on the combination brake and idler lever 160 to move the same forwardly from the neutral position shown in Figure 6. This causes the second rocker shaft 164 to rotate in a counterclockwise direction in Figure 7 and in a clockwise direction in Figure 11. The second rocker shaft 164 has one end of a crank arm 175 fixed thereto which extends upwardly and forwardly at an angle and has the rear end of a link 176 pivotally connected thereto. The front end of the link 176 is pivotally connected to the upper end of a secondary brake lever 177 pivotally mounted intermediate its ends, as at 180, on the inner end of a bar 181 (Figure 5) projecting inwardly from, and being secured to, the side frame member 11. Also pivoted intermediate its ends, as at 180, is a brake bar 182 which extends rearwardly and is fixed to one end of a flexible brake band 183, whose other end has an outwardly projecting portion 184 (Figure 7) thereon which is engaged by the lower free end of the secondary brake lever 177. The brake band has a suitable friction material on the inner face thereof which engages the periphery of the brake drum 55 heretofore described.

It is thus seen that with forward movement of the combination idler and brake lever 160, the brake band 183 is tightened about the brake drum 55 to retard or stop the vehicle, during which the cables 170, 171 are merely slackened. When the combination idler and brake lever 160 is returned to the neutral position shown in Figure 6, or is moved to the idler raising position shown in Figure 10, the crank arm 175 moves in a counter-clockwise direction in Figure 10 thereby releasing the brake band 183 from engagement with the periphery of the brake drum 55.

It is thus seen that there is provided an improved drive system for vehicles which permits selective use of either a three wheel support or a dual endless track support for the vehicle and wherein a single means controls the steering of the vehicle regardless of whether the caster wheel 100 or the crawler belts 41, 42 are in engagement with the surface S over which the vehicle is moving.

In the drawings and specification there has been set forth a preferred embodiment of the invention and although specific terms are employed, they are used in a generic and descriptive sense only, and not for purposes of limitation, the scope of the invention being defined in the claims.

I claim:
1. A self-propelled vehicle capable of traveling over irregular surfaces comprising a frame, a pair of transversely spaced driven traction wheels, an annular flange on each of said traction wheels and spaced from the axis of its respective traction wheel a lesser distance than the periphery of said traction wheel, at least one idler wheel and a pair of transversely spaced pulleys mounted on said frame, traction belts extending about the periphery of said pulleys and about the annular flanges on said driven traction wheels, means for raising and lowering said idler wheel to move said traction belts into and out of contact with the surface supporting said vehicle, comprising an idler wheel supporting bracket pivotally mounted on said frame adjacent said pulleys and adapted to rotatably support said idler wheel, a manual control lever, mechanical linkage between said manual control lever and said pivoted idler wheel supporting bracket, for pivoting said bracket to raised or lowered position in accordance with movement of said lever and means for locking said bracket in lowered position.

2. In a drive system for a vehicle, transversely spaced front wheels mounted on said vehicle and a prime mover also mounted on said vehicle; the combination of an annular flange on each of said front wheels and spaced from the axis of its respective front wheel a lesser distance than the periphery of said front wheel so the annular flanges do not engage the supporting surface, a transverse shaft rotatably mounted on the rear of said vehicle, a pair of pulleys fixed on opposite ends of said shaft, an endless crawler belt extending about the periphery of each of said pulleys and having their front portions mounted on the annular flanges on said front wheels, driving connections between the prime mover and the rear shaft for imparting rotation to the pulleys and the endless crawler belts and the front wheels, a caster wheel bracket pivotally mounted on said frame adjacent the transverse shaft, a caster wheel carried by said bracket, means for lowering and raising said bracket and caster wheel relative to the pulleys to raise the pulleys and the rear portions of the crawler belts when the caster wheel is in lowered position and to lower the pulleys and the rear portions of the crawler belts beneath the lowermost level of the caster wheel when the caster wheel is in raised position and means for locking said bracket and caster wheel in lowered position whereby said vehicle may be supported either on the crawler belts at the rear end thereof or on the caster wheel.

3. A self-propelled vehicle capable of traveling over irregular surfaces comprising a frame, a pair of transversely spaced driven traction wheels and a pair of transversely spaced pulleys mounted on said frame, traction belts connecting said pulleys with said driven traction wheels, at least one idler wheel mounted on said frame, means for raising and lowering said idler wheel to move at least a portion of said traction belts into and out of contact with the surface supporting said vehicle comprising an idler wheel supporting bracket adapted to rotatably support the idler wheel adjacent one end thereof, a pivot shaft mounted on said frame in spaced relation to the idler wheel and to which the other end of said bracket is pivotally connected, a toggle lever pivotally connected to the medial portion of said bracket, a crank arm pivotally connected at one of its ends to a medial portion of said toggle lever, a transverse rocker shaft spaced above said idler wheel and journaled on said frame, the end of said crank arm remote from said toggle lever being fixed to said rocker shaft, a manual control lever pivoted on said frame, and a mechanical connection between said control lever and said rocker shaft whereby reciprocatory movement of the control lever moves the rocker shaft to raise and lower the idler wheel relative to said traction belts.

4. In a structure according to claim 3, means for limiting movement of said toggle lever and said crank arm a predetermined distance beyond dead center as the idler wheel is moved into lowered position.

5. A vehicle comprising a frame, a prime mover carried thereby, a pair of transversely spaced front wheels and a pair of transversely spaced rear driving pulleys mounted thereon, a pair of endless crawler belts connecting the front wheels and the rear driving pulleys, driving connections between the prime mover and the rear driving pulleys for imparting rotation to said pulleys, said belt and said front wheels, retractable supporting means carried by said frame adjacent the rear of said vehicle comprising a bracket pivotally mounted on said frame for movement about a horizontal axis, a horizontally disposed pulley connected to said bracket, a caster wheel carried by said bracket and movable with said pulley, vehicle steering means connected to said endless crawler belts and to said horizontally disposed pulley, a control lever, a mechanical connection between said control lever and said bracket for raising and lowering said bracket in accordance with movement of said control lever, said bracket being so positioned when lowered that the caster wheel carried thereby will be at a lower elevation than said driving pulleys, whereby the rear of said vehicle may be supported alternatively by said caster wheel and said crawler belts.

6. A vehicle comprising a frame, a pair of transversely spaced traction wheels, an annular flange on each of said traction wheels and spaced from the axis of its respective traction wheel a lesser distance than the periphery of said traction wheel, a pair of transversely spaced pulleys mounted on said frame, traction belts extending about the periphery of the pulleys and about the annular flanges on the traction wheels, a retractable wheel carried by said frame adjacent said transversely spaced pulleys, and means for raising and lowering said retractable wheel to move said traction belts into and out of contact with the surface supporting said vehicle.

References Cited in the file of this patent

UNITED STATES PATENTS

| | | |
|---|---|---|
| 352,385 | Applegarth | Nov. 9, 1886 |
| 657,650 | Dyer | Sept. 11, 1900 |
| 1,296,309 | Netzel | Mar. 4, 1919 |
| 1,589,393 | Howe | June 22, 1926 |
| 1,940,523 | Barclay | Dec. 19, 1933 |
| 2,161,760 | Hacker | June 6, 1939 |
| 2,426,342 | Couse | Aug. 26, 1947 |
| 2,533,271 | Livermon | Dec. 12, 1950 |
| 2,592,023 | Gleason | Apr. 8, 1952 |

FOREIGN PATENTS

| | | |
|---|---|---|
| 22,738 | Great Britain | 1896 |
| 105,947 | Sweden | Nov. 17, 1942 |